(12) United States Patent
Winter et al.

(10) Patent No.: US 6,994,502 B2
(45) Date of Patent: Feb. 7, 2006

(54) POLE JOINT SCREW FOR A BASKETBALL GOAL SYSTEM

(75) Inventors: David C. Winter, Layton, UT (US); Brent Steed, Syracuse, UT (US)

(73) Assignee: Lifetime Products, Inc., Clearfield, UT (US)

( * ) Notice: Subject to any disclaimer, the term of this patent is extended or adjusted under 35 U.S.C. 154(b) by 0 days.

(21) Appl. No.: 10/641,238

(22) Filed: Aug. 14, 2003

(65) Prior Publication Data

US 2004/0120792 A1 Jun. 24, 2004

Related U.S. Application Data

(60) Provisional application No. 60/403,742, filed on Aug. 14, 2002.

(51) Int. Cl.
 *F16B 35/04* (2006.01)

(52) U.S. Cl. ........................................ 411/411; 411/415
(58) Field of Classification Search ................ 411/411, 411/415, 386, 533
See application file for complete search history.

(56) References Cited

U.S. PATENT DOCUMENTS

| | | | | |
|---|---|---|---|---|
| 2,321,378 A | * | 6/1943 | Green ........................ 411/414 |
| 3,748,949 A | * | 7/1973 | Dreger ........................ 411/411 |
| 3,784,949 A | * | 1/1974 | Jankowski et al. ......... 338/196 |
| 4,036,559 A | * | 7/1977 | Whitchurch ................ 403/361 |
| 5,188,496 A | * | 2/1993 | Giannuzzi ................... 411/386 |
| 5,902,197 A | * | 5/1999 | Davis et al. ................. 473/479 |
| 6,499,925 B2 | * | 12/2002 | Duran et al. ............. 411/366.1 |

\* cited by examiner

*Primary Examiner*—William L. Miller
(74) *Attorney, Agent, or Firm*—Workman Nydegger

(57) ABSTRACT

A pole joint screw may be used to connect a first section of a basketball support pole and a second section of a basketball support pole. The pole joint screw may include an elongated body including a first end and a second end, a head disposed on the first end of the elongated body, a threaded portion disposed on the second end of the elongated body, and a gap disposed between the head and the threaded portion. The gap is preferably sized and configured to receive a portion of the first section of the basketball support pole and a portion of the second section of the basketball support pole. The pole joint screw preferably freely rotates when the portion of the first section of the basketball support pole and the portion of the second section of the basketball support pole are located in the gap.

17 Claims, 1 Drawing Sheet

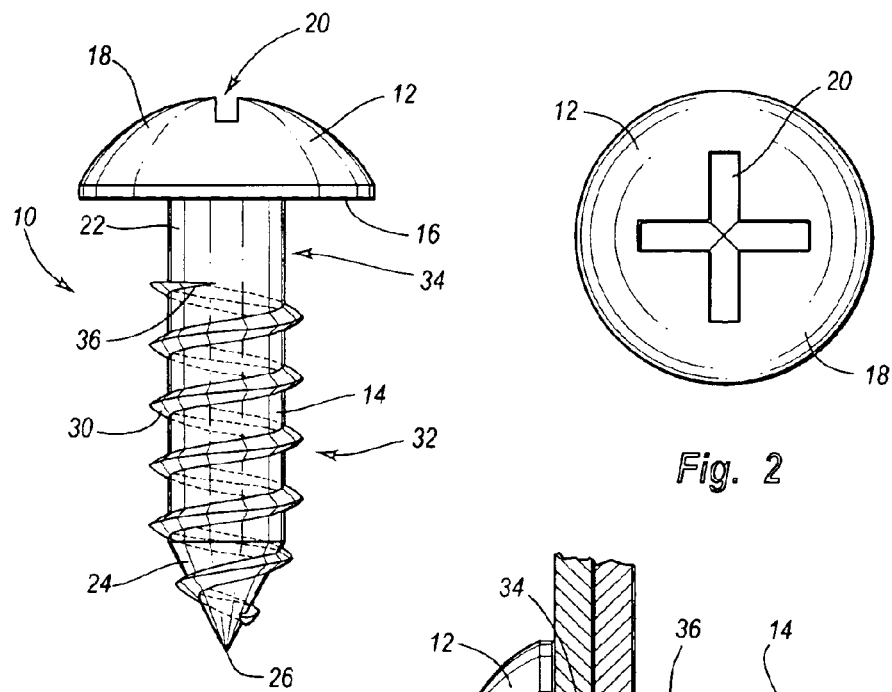
Fig. 1
Fig. 2
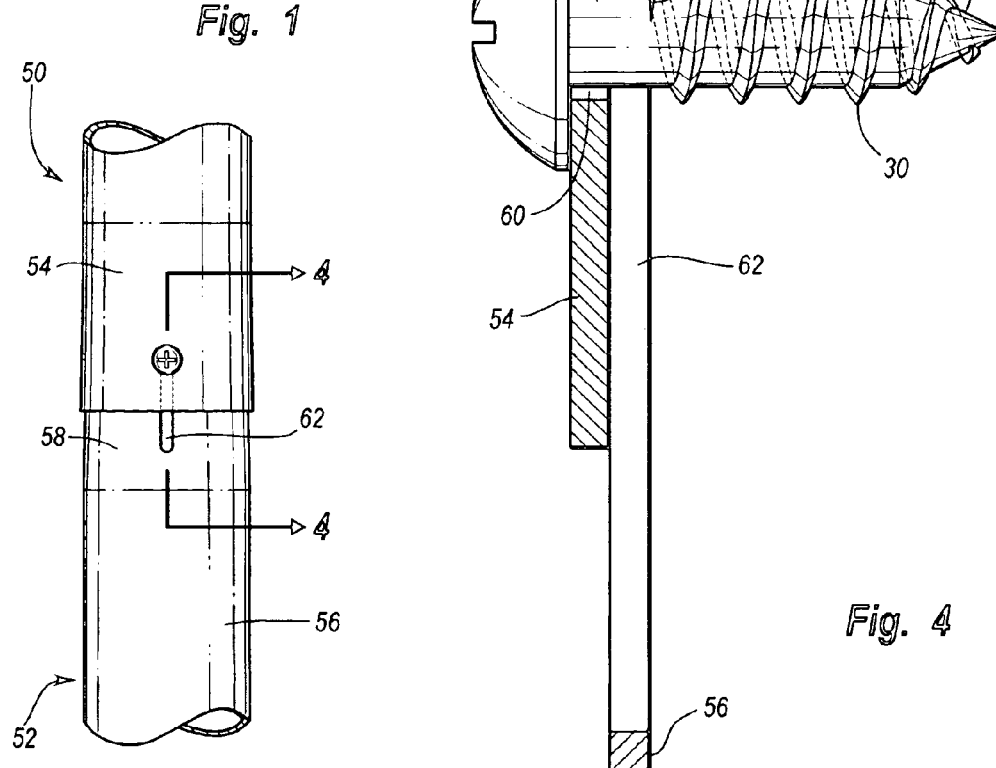
Fig. 3
Fig. 4

POLE JOINT SCREW FOR A BASKETBALL GOAL SYSTEM

CROSS-REFERENCE TO RELATED APPLICATIONS

This application claims priority to and the benefit of U.S. Provisional Patent Application Ser. No. 60/403,742, entitled Pole Joint Screw for a Basketball Goal System, which was filed on Aug. 14, 2002, and is hereby incorporated by reference in its entirety.

BACKGROUND OF THE INVENTION

Field of the Invention

Many types of fasteners are commonly used to connect two or more components or structures. For example, permanent fasteners such as rivets and weldments may be used to permanently connect two or more components or structures. Advantageously, rivets can provide secure connection of many types of components or structures, whether the rivets are axially loaded or eccentrically loaded. Rivets, which include a cylindrical body known as a shank and a rounded end called the head, can be attached by inserting the shank through holes drilled or punched through the components or structures. The rivets can then be fastened by either a hot driven or cold driven process. Disadvantageously, rivets are often time consuming to install, require special machinery or tools to install, and the rivets may damage the components or structures if the rivets are not carefully installed. In addition, rivets are often very difficult and time consuming to install in locations with limited access.

Detachable fasteners such as screws, bolts, cotter pins, keys, and snap rings are also often used to connect two or more components or structures. The detachable fasteners allow various components and structures to be assembled and disassembled because the fasteners create a non-permanent connection. For example, screws are commonly used to connect various items. Conventional screws include a thread disposed about a cylindrical or tapered body and the distance between the threads is the pitch. The major or outside diameter is the distance between the outermost portion of the threads and the minor or inside diameter is the distance between the innermost portion of the threads.

Screws are commonly used to connect two metal components by drilling or punching holes through the components and then tapping threads into the metal. Undesirably, these multiple steps are often time consuming and expensive during the manufacturing process. It is also known to use thread-cutting screws to connect two metal components. Thread-cutting screws cut their own threads and that eliminates the need for tapping. In addition, it is known to use self-drilling fasteners to connect two metal components in which the fasteners drill their own hole, tap a mating thread, and fasten in a single operation.

Disadvantageously, detachable fasteners can often be unintentionally released and that may allow the components to be unexpectedly and undesirably disconnected or detached. This may lead to collapse or failure of the connection and, for example, damage the components or structures. The unintentional release of detachable fasteners may be more likely if the connection is subject to vibration, shock or varying forces. In order to prevent detachable fasteners from unintentionally loosening, it is known to decrease the distance between the threads. It is also known to use self-locking fasteners such as locknuts, lock washers and speed nut fasteners. Unfortunately, these types of fasteners typically require access to both sides of the fastener to install, for example, the locknut, lock washer or speed nut fastener. Thus, these types of fasteners may be very difficult, if not impossible, to use in connection with structures that severely limit or do not allow access to both sides of the fastener.

Conventional basketball systems often require multiple fasteners to assemble the system. In particular, conventional basketball systems often include a support pole and a goal assembly with a backboard and a goal or rim. The support pole is commonly used to support the goal assembly above the playing surface. A conventional support pole is generally at least ten feet in length in order to support the goal assembly ten feet above the playing surface, which is the regulation height for a basketball rim.

Support poles for basketball systems are often constructed from two sections that are connected together to facilitate transportation, shipping and storage of the basketball system. That is, because poles that are ten feet or longer in length are very to ship, store and manipulate, it is often desirable for the basketball system to have a support pole that is formed from two or more sections that are interconnected. Accordingly, conventional basketball systems typically include support poles that are divided into two or more sections and the sections may have overlapping portions that are connected to form the support pole. Conventional screws are often used to connect the overlapping portions to form the support pole. Disadvantageously, conventional screws may undesirably be unintentionally released because conventional screws do not provide permanent connection of the support pole. In addition, conventional screws are more likely to be unintentionally released because basketball support poles are frequently subject to vibration, shock and other various forces that occur while playing the game of basketball.

It is also known to use bolts to connect the sections of a basketball support pole. In order to connect two sections of a basketball support pole with a bolt, holes must generally be formed in both sides of each section of the support pole. The holes in each side of the support pole sections must then be carefully aligned to allow the bolt to be inserted through the holes and extend through the opposite side of the pole. A nut is then attached to the protruding end of the bolt. Disadvantageously, installation of the bolt and nut is often time consuming, expensive and difficult to install. It should be noted that the bolt cannot extend through only one side or outer wall of the support pole sections because the elongated support pole sections typically prevent access to the end of the bolt disposed within the pole. That is, because the support pole sections are typically at least three feet in length, it is very difficult if not impossible to connect a nut to an end of a bolt disposed within the support pole sections. Further, access to the end of a bolt disposed within the support pole sections may also be severely limited because the diameter of the support pole sections is typically about three inches. Thus, the elongated length and small diameter of the support pole sections generally prevents a nut from being attached to the end of a bolt within the support pole sections.

As discussed above, known fasteners may include self-locking features such as locknuts, lock washers and speed nuts. Disadvantageously, these types of fasteners require holes to be formed in both sides of the support pole sections and the locknut, lock washer or speed nut be attached to the protruding end of the fastener. These types of fasteners must extend through both sides of the support pole sections because, as discussed above, there is no or very limited access to the end of the fastener when it is disposed within the support pole sections. In addition, these types of fasteners are often difficult to install because holes must be formed in each side of the support pole sections and the holes must be aligned to allow the fastener to be inserted. Further, these types of fasteners are relatively expensive and consumers may have a difficult time installing the fasteners.

BRIEF SUMMARY OF THE INVENTION

A need therefore exists for a fastener for a basketball system that eliminates the above-described disadvantages and problems.

One aspect of the present invention is a fastener that allows two or more components to be connected. Desirably, the fastener allows two elongated or enlarged structures to be connected in which it is difficult or impossible to access both sides of the fastener. The fastener is preferably sized and configured to be used in connection with a basketball system and, in particular, the fastener may be used to connect two elongated poles such as support poles for a basketball system.

Another aspect is a fastener that allows two basketball support pole sections to be joined. Advantageously, this allows a basketball support pole to be shipped or transported in an unassembled configuration and the support pole sections can then be joined by the fastener. The fastener allows the support pole sections to be easily and quickly connected.

Yet another aspect is a fastener, such as a screw, that provides a more permanent connection between components than a conventional screw. In particular, the fastener is preferably a screw that is difficult to unscrew or disconnect. That is, the screw is designed such that it cannot be unintentionally released or removed. Thus, the screw may provide a reliable and secure connection of two or more components. The screw is also preferably generally resistant to vibration, shock, and varying forces and loads. Therefore, the screw will not undesirably loosen or detach when it is subject to vibration, shock or varying forces and loads.

Still another aspect is a screw that provides a more permanent connection and the screw can be used by itself or in connection with other similar types of screws. The screw can also be used in connection with other types of fasteners such as bolts, clamps, pins, retaining rings, etc. In addition, the screw may provide a fixed connection between two or more components, or the screw may provide a sliding connection between two or more components. For example, the screw may be inserted through two generally aligned holes in the components to provide a fixed connection. On the other hand, the screw may be inserted through one or more slots to allow a sliding connection between the components to be established.

A further aspect is a fastener such as a screw that can be locked into position by completely attaching the screw to the components. Advantageously, no other steps or components are required to lock the screw into position. Significantly, the screw is fast and easy to use, and it can be installed with conventional tools such as a screwdriver. Moreover, the screw can be easily installed by the manufacturer, retailer or consumer. Further, the screw has a relatively straightforward design and it does not require any additional parts.

Another aspect is a pole joint screw that is sized and configured to connect a first section of a basketball support pole to a second section of a basketball support pole. The pole joint screw may include an elongated body including a first end and a second end, a head disposed on the first end of the elongated body, a threaded portion disposed on the second end of the elongated body, and a gap disposed between the head and the threaded portion. The gap is preferably sized and configured to receive a portion of the first section of the basketball support pole and a portion of the second section of the basketball support pole. The pole joint screw preferably freely rotates when the portion of the first section of the basketball support pole and the portion of the second section of the basketball support pole are located in the gap. In addition, the threaded portion of the pole joint screw may form a self tapping screw. Further, the first section of the basketball support pole may include an opening and the second section of the basketball support pole may include an opening, the opening in the first section and the opening in the second section preferably have a diameter that is generally less than a major diameter of the screw and generally equal to or larger than a minor diameter of the screw. Finally, the screw may have a diameter of the gap that is generally equal to the diameter of the first section and the second section of the basketball support pole.

A further aspect is a screw with a body including a first end and a second end, a head disposed at the first end of the body, the head including one or more slots that are sized and configured to allow the screw to be rotated, a threaded portion disposed at the second end of the body, the threaded portion including one or more threads, and a gap disposed between the head and the threaded portion, the gap being sized and configured to allow the screw to connect at least two components and prevent the unintentional release of the components. Desirably, the gap has a distance that is generally equal to the thickness of the components to be connected. In addition, the threaded portion may form a self tapping screw. The screw may also include a first position in which the screw partially connects the components and a second position in which the screw has fully connected the components, the screw being capable of being intentionally disconnected from the components when the screw is in the first position and the screw being incapable of being unintentionally disconnected from the components in the second position. The screw preferably freely rotates when the portion of the components are located in the gap to securely interconnect the components.

These and other aspects, features and advantages of the present invention will become more fully apparent from the following detailed description of preferred embodiments and appended claims.

BRIEF DESCRIPTION OF THE DRAWINGS

The appended drawings contain figures of preferred embodiments to further clarify the above and other aspects, advantages and features of the present invention. It will be appreciated that these drawings depict only preferred embodiments of the invention and are not intended to limits its scope. The invention will be described and explained with additional specificity and detail through the use of the accompanying drawings in which:

FIG. 1 is a side view of a preferred embodiment of the pole joint screw;

FIG. 2 is a top view of the pole joint screw shown in FIG. 1;

FIG. 3 is a top view of the pole joint screw, illustrating the pole joint screw connecting two elongated sections of an exemplary basketball support pole; and FIG. 4 is a partial cross-sectional side view of the pole joint screw shown in FIG. 3.

DETAILED DESCRIPTION OF THE PREFERRED EMBODIMENTS

The present invention is directed towards a pole joint screw for use in connection with a support pole for a basketball system. The principles of the present invention, however, are not limited to a pole joint screw for use in connection with a support pole for a basketball system. It will be understood that, in light of the present disclosure, the pole joint screw disclosed herein can be successfully used in connection with other types of sporting equipment and devices.

Additionally, to assist in the description of the pole joint screw, words such as top, bottom, front, rear, right and left are used to describe the accompanying figures. It will be appreciated, however, that the present invention can be located in a variety of desired positions—including various angles, sideways and even upside down. A detailed description of the pole joint screw now follows.

As seen in FIG. 1, the pole joint screw 10 includes a head 12 and a body 14. The head 12 includes a first end 16 that is preferably generally flat or planar and a second end 18 that includes one or more slots or openings 20. The slots 20 are preferably sized and configured to receive a screwdriver, such as a flat head for Phillips head, or other fastening tool to allow the screw 10 to be tightened or loosened. One skilled in the art will appreciate that the head 12 of the screw 10 can have other suitable arrangements depending, for example, upon the intended use of the screw or the type of tool intended to be used to tighten the screw.

The body 14 of the screw 10, which may also be referred to as the shank, preferably has a generally cylindrical configuration. In particular, the body 14 may include a first portion 22 that is disposed towards the head 12 of the screw 10 and a second portion 24 that is disposed away from the head of the screw. The first portion 22 preferably has a generally cylindrical configuration with a generally constant diameter and the second portion 24 is preferably tapered towards the distal end 26 of the screw 10. It will be understood that the body 14 of the screw 10 could have other suitable arrangements and configurations. For example, the entire body 14 of the screw 10 could have a generally constant diameter or the entire body of the screw could be tapered. Additionally, the body 14 of the screw 10 could be divided into more than two portions and the various portions could have other suitable configurations. Thus, one skilled in the art will appreciate that the body 14 of the screw 10 could have various suitable designs, shapes and arrangements depending, for example, upon the intended use of the screw.

The screw 10 is preferably constructed from metal such as steel, aluminum, nickel, stainless steel, etc. It will be appreciated that the screw 10 could also be constructed from other materials with suitable characteristics such as plastic. Moreover, the screw 10 could include a covering or coating, such as rubber or plastic, depending upon the intended use of the screw.

The screw 10 includes threads 30 that extend along a portion of the body 14 of the screw. The threads 30 preferably begin proximate the distal end 26 of the screw 10 and the threads extend towards the head 12 of the screw. The threads 30 may have any suitable major and minor diameter depending, for example, upon the type and size of materials intended to be joined by the screw 10.

In greater detail, the screw 10 includes a threaded portion 32 which includes the threads 30 and a non-threaded portion or gap 34. The threaded portion 32 preferably forms part of a self-tapping screw in which the threads 30 bite or cut into the material intended to be connected. The gap 34 is preferably disposed between the threaded portion 32 and the head 12 of the screw 10, and the gap does not include threads. Thus, the gap 34 forms a space or break between the threads 30 in the threaded portion 32 of the screw 10 and the first end 16 of the head 12.

The gap 34 preferably has a diameter that is generally the same as the diameter of the body 14 of the screw, but the gap may have a diameter that is larger or smaller than the diameter of the body. The gap 34 may also include other structures such as ribs or struts, but the gap preferably does not include any structures that extend beyond the major diameter of the threads 30. As discussed in greater detail below, the gap 34 preferably has a distance that is generally equal to the thickness of the components to be connected, but the gap could have any desired size. It will be appreciated that the gap 34 could have other suitable sizes and configurations depending, for example, upon the components that are intended to be connected.

The gap 34 is preferably sized and configured such that when the components intended to be connected are disposed within the gap, the screw 10 permanently connects the components. In particular, the end 36 of the threads 30 is preferably angled so that when the components intended to be connected are disposed within the gap 34, rotating the screw 10 in either direction will not cause the screw to be loosened or removed. Instead, the screw 10 will simply rotate in a stationary position because the threads 30 are not engaged with any material and the major or outer diameter of the threads is larger than the openings or holes in the connected components. Thus, the end 36 of the threads 30 is preferably angled so that it will not engage or bite into any material, and the screw 10 will simply rotate in a fixed position so that the components may not be unintentionally disconnected.

The screw 10 is preferably sized and configured to allow two or more components to be connected. In particular, the screw 10 may allow two or more components to be generally permanently connected without requiring a device such as a locknut, lock washer or speed nut be attached to the distal end 26 of the screw 10. Advantageously, the screw 10 allows two elongated structures to be securely connected where access to the distal end 26 of the screw 10 is limited or impossible. Accordingly, the screw 10 may be used to connect two elongated poles, for example, such as the support pole for a basketball system.

As shown in FIGS. 3 and 4, the screw 10 may be used in connection with a basketball system 50 and, in particular, it may be used to connect two support pole sections of the basketball system. For example, in an exemplary embodiment, the basketball system 50 may include a support pole 52 that is divided into two or more sections. In particular, the support pole 52 may include a first section 54 and a second section 56 and the second section may include a tapered portion 58 that is inserted into an end of the first section. The screw 10 is then used to securely connect the first section 54 and the second section 56 of the support pole 52.

In greater detail, the screw 10 is inserted into an opening or hole 60 that may be drilled or punched into the first section 54 of the support pole 52 and a slot 62 formed in the second section 56 of the support pole. When the screw 10 is fully inserted into the hole 60 and the slot 62, the first and second sections 54, 56 of the support pole 52 may be permanently connected. In particular, as shown in FIG. 4, the support pole sections 54 and 56 are disposed in the gap 34 and the screw 10 cannot be unintentionally removed. Advantageously, the slot 62 allows the first and second sections 54, 56 of the support pole 52 to slide or move relative to each other along a longitudinal axis, but the first and second sections of the support pole cannot be disconnected. It will be appreciated that the first and second sections 54, 56 of the support pole 52 may include any suitable combination of holes, slots or other openings to allow the support pole to be connected. It will also be appreciated that holes, slots or other openings do not have to be formed or created in the first and second sections 54, 56 of the support pole 52 because the screw 10 may also be a self-drilling fastener. Further, the holes, slots or other openings in the first and second sections 54, 56 may be tapped or threaded, if desired.

The hole 60 and the slot 62 preferably have a size and configuration that allows the threads 30 of the screw 10 to engage the first and second sections 54, 56 of the support pole 52 as the screw is being inserted, but the screw freely rotates within the hole and slot when the screw is completely inserted. Thus, the hole 60 and slot 62 preferably has a diameter that is less than the major diameter of the screw 10, but equal to or larger than the minor diameter of the screw. One skilled in the art will appreciate that the holes, slots and other openings could have other suitable sizes and configurations, depending, for example, upon the size and type of screw 10.

Advantageously, the screw 10 is reliable, low cost and allows the basketball system 50 to be easily assembled. Significantly, the screw 10 can also be used to assemble or connect two pieces of material and it does not have to be used in connection with basketball systems or basketball support poles. In fact, the screw 10 can be used in connection with any application that requires two pieces of material to be held together by a screw or a safety screw.

Significantly, the screw 10 can be used as a safety screw or as a second option if the first fastener or connector fails. For example, the tapered swage may be a first option and the screw 10 is a safety screw in case the first option fails. Thus, the screw 10 can be used to ensure a safer product. It will be understood, however, that the screw 10 does not have to be used as a safety screw and, in fact, the screw can be used in a wide variety of situations and locations.

In one preferred embodiment, the screw 10 may include an elongated body 14 with an overall length of about 0.75 inches, which includes both the threaded portion 32 and the gap 34. Preferably, the gap 34 has a length of about 0.14 inches, but the gap could be larger or smaller depending upon the size of the components intended to be connected. Advantageously, this screw 10 with a length of about 0.75 inches and a gap 34 of about 0.14 includes could be used in connection with a support pole 52 for a basketball system 50 with a diameter of about three inches. It will be appreciated, however, that the screw 10 can have any suitable size and configuration depending, for example, upon the materials intended to be connected or the size of the support pole if it is being used in connection with a basketball goal system.

Please note the appended drawings contain figures of preferred embodiments to further clarify the above and other aspects, advantages and features of the present invention. It will be appreciated that these drawings depict only preferred embodiments of the invention and are not intended to limits its scope.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A pole joint screw for connecting a first section of a basketball support pole to a second section of a basketball support pole, the pole joint screw comprising:

an elongated body including a first end and a second end;

a head disposed on the first end of the elongated body;

a threaded portion disposed on the second end of the elongated body, the threaded portion including one or more threads; and a gap disposed between the head and the threaded portion, the gap being sized and configured to receive a portion of the first section of the basketball support pole and a portion of the second section of the basketball support pole;

a first position in which the one or more threads engage the support pole and the pole joint screw can be attached or removed from the support pole;

a second position in which a portion of the first section of the support pole and a portion of the second section of the support pole are disposed within the gap of the pole joint screw;

wherein in the second position the one or more threads do not engage the support pole and the pole joint screw generally cannot be attached or removed from the support pole because the pole joint screw generally freely rotates in the second position.

2. The pole joint screw as in claim 1, wherein the threaded portion of the pole joint screw forms a self tapping screw.

3. The pole joint screw as in claim 1, further comprising an opening in the first section of the basketball support pole and an opening in the second section of the basketball support pole, the opening in the first section and the opening in the second section having a diameter that is generally less than a major diameter of the screw and generally equal to or larger than a minor diameter of the screw.

4. The pole joint screw as in claim 3, further comprising a length of the gap that is generally equal to the thickness of the first section and the second section of the basketball support pole.

5. A screw that is sized and configured to connect a first elongated section and a second elongated section of a support pole for a basketball system, the screw comprising:

a body including a first end and a second end;

a head disposed at the first end of the body, the head including one or more slots that are sized and configured to allow the screw to be rotated;

a threaded portion disposed at the second end of the body, the threaded portion including one or more threads, each of the one or more threads including a first end that is disposed towards the first end of the body and a second end that is disposed towards the second end of the body;

a gap disposed between the head and the threaded portion, the gap being sized and configured to receive a portion of the first section of the support pole and a portion of the second section of the support pole to allow the screw to connect the first and second sections of the support pole and prevent the unintentional release of the first and second sections; and an angled portion disposed at the first end of the one or more threads, the angled portion being sized and configured to allow the screw to simply rotate in a fixed position when the screw connects the first and second sections of the support pole, and rotating the screw in either direction will not cause the screw to be loosened or removed.

6. The screw as in claim 5, wherein the gap has a distance that is generally equal to the thickness of the first and second section of the support pole.

7. The screw as in claim 5, wherein the threaded portion forms a self tapping screw.

8. The screw as in claim 5, further comprising a first position in which the screw partially connects the components and a second position in which the screw has fully connected the components, the screw being capable of being intentionally disconnected from the components when the screw is in the first position and the screw being incapable of being unintentionally disconnected from the components in the second position.

9. The screw as in claim 5, wherein the screw freely rotates when the portion of the first section of the support pole and the portion of the second section of the support pole are located in the gap.

10. The screw as in claim 5, further comprising an opening in the first section of the support pole and an opening in the second section of the support pole, the opening in the first section of the support pole and the opening in the second section of the support pole having a diameter that is generally less than a major diameter of the screw and generally equal to or larger than a minor diameter of the screw.

11. The screw as in claim 5, further comprising a length of the gap that is generally equal to the thickness of the first section of the support pole and the thickness of the second section of the support pole that is disposed within the gap.

12. A pole joint screw for connecting a first elongated section of a basketball support pole and a second elongated section of a basketball support pole, the pole joint screw comprising:

an elongated body including a first end and a second end;

a head disposed at the first end of the elongated body, the head including a first surface that is disposed towards the elongated body and is disposed generally perpendicular to the elongated body;

a threaded portion disposed towards the second end of the elongated body, the threaded portion including at least one thread and each thread including a first end disposed towards the first end of the elongated body and a second end disposed towards the second end of the elongated body;

a gap disposed between the head and the threaded portion, the gap being sized and configured to receive a portion of the first section of the basketball support pole and a portion of the second section of the basketball support pole when the screw is connected to the support pole, the gap being sized and configured to allow the screw to freely rotate when the first and second sections of the support pole are connected and to prevent the unintentional release of the first and second sections; and a terminal section located at the first end of the thread, the terminal section being generally perpendicular to the body of the stem and generally parallel to the first surface of the head, the terminal section being generally equidistant from the first surface of the head;

wherein the first surface of the head forms a first side of the gap and the terminal section forms a second side of the gap; and wherein when the first and second sections of the support pole are connected by the screw, rotating the screw in either direction will not cause the screw to be loosed or removed.

13. The pole joint screw as in claim 12, further comprising a first side of the thread that is generally disposed towards the first end of the elongated body and a second side of the thread that is generally disposed towards the second end of the elongated body, the terminal section being formed in the first side of the thread proximate the head of the screw.

14. The pole joint screw as in claim 12, wherein the terminal section of the thread does not engage the first section of the support pole or the second section of the support pole when the first and second sections of the support pole are connected, thereby allowing the screw to rotate freely.

15. The pole joint screw as in claim 12, further comprising a hole in the first section of the support pole and a slot in the second section of the support pole, the screw being inserted through the hole in the first section of the support pole and the slot in the second section of the support pole.

16. The pole joint screw as in claim 12, further comprising a length of the gap that is generally equal to the thickness of the first section of the support pole and the thickness of the second section of the support pole.

17. The pole joint screw as in claim 12, further comprising a first position in which the thread engages portions of the support pole so that the screw can be attached or removed, and a second position in which the thread does not engage portions of the support pole and the screw cannot be attached or removed.

\* \* \* \* \*

UNITED STATES PATENT AND TRADEMARK OFFICE
CERTIFICATE OF CORRECTION

PATENT NO. : 6,994,502 B2
APPLICATION NO. : 10/641238
DATED : February 7, 2006
INVENTOR(S) : David C. Winter and Brent Steed It is certified that error appears in the above-identified patent and that said Letters Patent is hereby corrected as shown below:

Column 2
Line 19, change "very" to --very difficult--

Column 4
Line 50, change "limits" to --limit--

Column 7
Line 16, change "has" to --have--

Signed and Sealed this

Fifteenth Day of August, 2006

JON W. DUDAS
*Director of the United States Patent and Trademark Office*